(12) United States Patent
Furbeck et al.

(10) Patent No.: US 9,497,290 B2
(45) Date of Patent: Nov. 15, 2016

(54) MEDIA PRESENTATION DESCRIPTION DELTA FILE FOR HTTP STREAMING

(75) Inventors: David Stuart Furbeck, Keller, TX (US); Suresh Chitturi, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 415 days.

(21) Appl. No.: 12/815,269

(22) Filed: Jun. 14, 2010

(65) Prior Publication Data

US 2011/0307581 A1    Dec. 15, 2011

(51) Int. Cl.
*G06F 15/16* (2006.01)
*H04L 29/08* (2006.01)
*H04L 29/06* (2006.01)

(52) U.S. Cl.
CPC ........... *H04L 67/34* (2013.01); *H04L 65/1083* (2013.01); *H04L 65/60* (2013.01); *H04L 67/02* (2013.01)

(58) Field of Classification Search
USPC ........................................................ 709/219
See application file for complete search history.

(56) References Cited

U.S. PATENT DOCUMENTS

| | | | |
|---|---|---|---|
| 7,356,679 B1* | 4/2008 | Le et al. | 713/1 |
| 2006/0221190 A1* | 10/2006 | Limberis et al. | 348/207.1 |
| 2007/0150524 A1* | 6/2007 | Eker et al. | 707/203 |
| 2007/0260653 A1* | 11/2007 | Jaffri et al. | 707/205 |
| 2007/0294321 A1* | 12/2007 | Midgley et al. | 707/204 |
| 2008/0104124 A1* | 5/2008 | Bao et al. | 707/104.1 |
| 2008/0162655 A1* | 7/2008 | Khedouri et al. | 709/206 |
| 2010/0031366 A1* | 2/2010 | Knight et al. | 726/26 |
| 2011/0099594 A1* | 4/2011 | Chen et al. | 725/105 |

FOREIGN PATENT DOCUMENTS

| | | | |
|---|---|---|---|
| JP | 2003216527 A | 7/2003 |
| JP | 2003330849 A | 11/2003 |
| JP | 2004102871 A | 4/2004 |
| JP | 2005353058 A | 12/2005 |
| JP | 2007095082 A | 4/2007 |
| JP | 2009116846 A | 5/2009 |

OTHER PUBLICATIONS

PCT International Search Report; Application No. PCT/US2011/039910; Aug. 3, 2011; 3 pages.
PCT Written Opinion of the International Searching Authority; Application No. PCT/US2011/039910; Aug. 3, 2011; 5 pages.
3GPP TSG-SA4 #58; "Essential Corrections to 3GPP Adaptive HTTP Streaming;" S4-100355; Vancouver, Canada; Apr. 26-30, 2010; 35 pages.

(Continued)

*Primary Examiner* — Richard G Keehn
(74) *Attorney, Agent, or Firm* — Conley Rose, P.C.; J. Roberts Brown, Jr.

(57) ABSTRACT

A method for obtaining media presentation description information. The method includes a client obtaining information related to a change in a first Media Presentation Description (MPD) on a server. The method further includes the client updating a second MPD on the client with the information related to the change.

30 Claims, 7 Drawing Sheets

(56) References Cited

OTHER PUBLICATIONS

3GPP SA4 #57; "Media Presentation Description in HTTP Streaming;" S4-100080; St. Julian, Malta; Jan. 25-29, 2010; 11 pages.
ISO/IEC JTC1/SC29/WG11; "DASH MPD Delta Files;" MPEG2010/M18482; Guangzhou, China; Oct. 2010; 10 pages.
Rosenberg, J., et al.; IETF; Title: An Extensible Markup Language (XML) Document Format for Indicating a Change in XML Configuration Access Protocol (XCAP) Resources; RFC 5874; May 2010; 25 pgs.
W3C; XQuery and XPath Full Text 1.0; www.w3.org/TR/xpath; W3C Candidate Recommendation Jan. 28, 2010; 148 pgs.
3GPP TS 26.234 v8.4.0; 3rd Generation Partnership Project; Technical Specification Group Services and System Aspects; Transparent end-to-end Packet-Switched Streaming Service (PSS); Protocols and Codecs; Release 8; Sep. 2009; 156 pgs.
3GPP TS 26.244 v8.2.0; 3rd Generation Partnership Project; Technical Specification Group Services and System Aspects Transparent end-to-end Packet Switched Streaming Service (PSS); 3GPP File Format (3GP); Release 8; Sep. 2009; 52 pgs.
ISO/IEC 14496-12; Information Technology—Coding of Audio-Visual Objects; Part 12: ISO Base Media File Format; Third edition; Oct. 15, 2008; 118 pgs.

Urpalainen, J.; Network Working Group; Title: An Extensible Markup Language (XML) Patch Operations Framework Utilizing XML Path Language (XPath) Selectors; RFC 5261; Aug. 2008; 41 pgs.
Canadian Office Action; Application No. 2,802,233; Sep. 1, 2015; 3 pages.
Canadian Office Action; Application No. 2,802,233; Oct. 16, 2014; 4 pages.
Chinese Office Action as Received in Co-pending Application No. 201180039108.6 on Sep. 23, 2014; 8 pages. (No English translation available).
Taiwan Office Action; Application No. 100120757; Mar. 25, 2014; 13 pages.
Australian Office Action; Application No. 2011268005; Mar. 11, 2014; 3 pages.
Korean Office Action as Received in Co-pending Application No. 10-2013-7000689 on May 12, 2014; 4 pages. (No English translation available).
3GPP TS 26.234 V9.2.0; 3rd Generation Partnership Project; Technical Specification Group Services and System Aspects; Transparent end-to-end Packet-Switched Streaming Service (PSS); Protocols and Codecs; Release 9; Mar. 2010; 176 pages.
Japanese Office Action; Application No. 2013-515396; Dec. 26, 2013; 3 pages. (No English translation available).
Korean Office Action; Application No. 10-2013-7000689; Dec. 18, 2013; 11 pages.

\* cited by examiner

```xml
<?xml version="1.0" encoding="UTF-8"?>

<xs:schema xmlns:xs="http://www.w3.org/2001/XMLSchema">

<!-- patch-ops -->

<xs:simpleType name="pos">
   <xs:restriction base="xs:string">
   <xs:enumeration value="before"/>
   <xs:enumeration value="after"/>
   <xs:enumeration value="prepend"/>
   </xs:restriction>
  </xs:simpleType>

<xs:complexType name="add">
   <xs:complexContent mixed="true">
    <xs:restriction base="xs:anyType">
     <xs:sequence>
      <xs:any processContents="lax" namespace="##any"
          minOccurs="0" maxOccurs="unbounded"/>
     </xs:sequence>
     <xs:attribute name="sel" type="xs:string"
              use="required"/>
     <xs:attribute name="pos" type="pos"/>
     <xs:attribute name="type" type="xs:string"/>
    </xs:restriction>
   </xs:complexContent>
  </xs:complexType>

<xs:complexType name="replace">
   <xs:complexContent mixed="true">
    <xs:restriction base="xs:anyType">
     <xs:sequence>
      <xs:any processContents="lax" namespace="##any"
          minOccurs="0" maxOccurs="1"/>
     </xs:sequence>
     <xs:attribute name="sel" type="xs:string" use="required"/>
    </xs:restriction>
   </xs:complexContent>
  </xs:complexType>

<xs:simpleType name="ws">
   <xs:restriction base="xs:string">
   <xs:enumeration value="before"/>
   <xs:enumeration value="after"/>
   <xs:enumeration value="both"/>
   </xs:restriction>
  </xs:simpleType>
```

Figure 4a

```
    xs:complexType name="remove">
     <xs:attribute name="sel" type="xs:string" use="required"/>
     <xs:attribute name="ws" type="ws"/>
    </xs:complexType>
<!-- end of patch-ops -->

<!-- root element -->
   <xs:element name="delta">
    <xs:complexType>
     <xs:sequence minOccurs="0" maxOccurs="unbounded">
      <xs:choice>
       <xs:element name="add">
        <xs:complexType mixed="true">
         <xs:complexContent>
          <xs:extension base="add">
           <xs:anyAttribute processContents="lax"/>
          </xs:extension>
         </xs:complexContent>
        </xs:complexType>
       </xs:element>
       <xs:element name="remove">
        <xs:complexType>
         <xs:complexContent>
          <xs:extension base="remove">
           <xs:anyAttribute processContents="lax"/>
          </xs:extension>
         </xs:complexContent>
        </xs:complexType>
       </xs:element>
       <xs:element name="replace">
        <xs:complexType mixed="true">
         <xs:complexContent>
          <xs:extension base="replace">
           <xs:anyAttribute processContents="lax"/>
          </xs:extension>
         </xs:complexContent>
        </xs:complexType>
       </xs:element>
       <xs:any namespace="##other" processContents="lax"/>
      </xs:choice>
     </xs:sequence>
     <xs:attribute name="sequenceNumber" type="xs:positiveInteger" use="required"/>
     <xs:attribute name="xpathVersion" type="xs:string" default="1.0"/>
    </xs:complexType>
   </xs:element>
</xs:schema>
```

Figure 4b

MEDIA PRESENTATION DESCRIPTION DELTA FILE FOR HTTP STREAMING

BACKGROUND

The 3$^{rd}$ Generation Partnership Project (3GPP) has developed a feature known as HTTP Streaming, whereby mobile telephones, personal digital assistants, handheld or laptop computers, desktop computers, set-top boxes, network appliances, and similar devices can receive streaming media content via the hypertext transfer protocol (HTTP). Any device that can receive HTTP Streaming data will be referred to herein as a client. Content that might be provided to such client devices via HTTP can include streaming video, streaming audio, and other multimedia content. In some cases, the content is prepared and then stored on a standard web server for later streaming via HTTP. In other cases, live or nearly live streaming might be used, whereby content is placed on a web server at or near the time the content is created. In either case, clients can use standard web browsing technology to receive the streamed content at any desired time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4*a* and 4*b* illustrate a delta schema according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
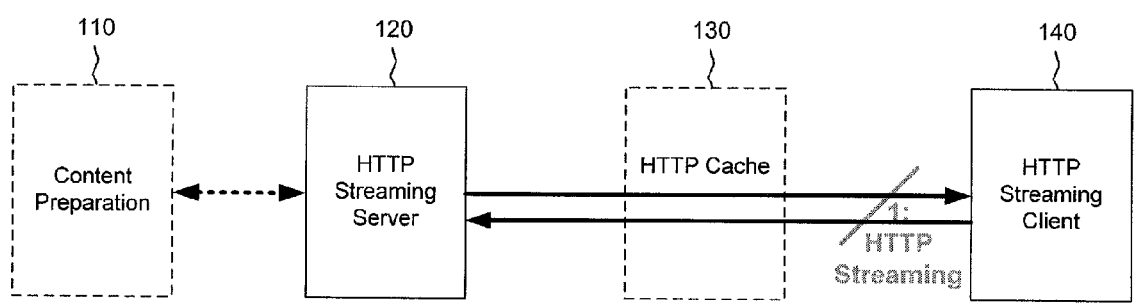
FIG. 1 is a system architecture for adaptive HTTP streaming.

FIG. 1 illustrates a typical system architecture for adaptive HTTP streaming. In a content preparation phase 110, a media presentation is prepared for HTTP streaming. The content is then stored on an HTTP streaming server 120 and/or possibly in an HTTP cache 130. An HTTP streaming client 140 might use an HTTP GET request or a similar message to download the media presentation from the server 120 or the cache 130.

The media presentation might be described in an extensible markup language (XML) document, which in the 3GPP specifications is called a Media Presentation Description (MPD). The MPD contains metadata informing the client of the formats in which the media content is encoded, such as the bitrates, codecs, screen resolutions, and languages. Each different combination of such parameters can be referred to as a representation of the content, and multiple different representations may describe the same content. This allows the client to choose a particular representation based possibly on its screen resolution, the current channel bandwidth, the current channel reception conditions, the language preference of the user, and other parameters.

In cases where live streaming is not used, an MPD describing an entire presentation might be provided to the client, and the client might use the metadata in the MPD throughout the presentation. In live streaming cases, however, it may not be possible to provide the metadata about the entire media stream prior to the commencement of the streaming, because the metadata may not be known yet. Also, the parameters related to a streaming session may change during the course of the session. For example, the client may move into an area with poor reception, and the data rate may slow down. In such a case, the client may need to switch to a representation with a lower bit rate. In another example, the client device may choose to switch the display of the streamed content from portrait to landscape mode, in which case a different representation may be required.

For these reasons, it may not be possible to provide the client with an MPD describing an entire presentation. In such cases, a media presentation may be broken down into segments, and a portion of the MPD may describe each segment. That is, with HTTP Streaming, the media may be downloaded one segment at a time so that play-out of live content does not fall too far behind live encoding and so that the client can switch to a different content encoding adaptively according to channel conditions or other factors, as described above.

The segments are addressable with the information in the "Url" XML element in the MPD. The "Url" element contains the URL of the segment and may be restricted by a "range" attribute that could be used with the Ranges header of an HTTP GET request. A new segment of content may be added at regular intervals, such as every ten seconds, and corresponding new information may be added to the MPD as each new segment of content is added. Therefore, the size of the MPD may grow as the streaming of the content progresses.

Figure 2:
FIG. 2 is an example of a media presentation description document according to an embodiment of the disclosure.

An example MPD is illustrated in FIG. 2 and can be referred to as "exampleMPD.xml". Multiple portions 210 of the example MPD each describe a segment of the media presentation. In the interest of saving space in the figure, only two such portions 210 are shown, but in an actual MPD a large number of such portions may be present. In this example, it can be assumed that there are three periods of ten minutes duration, for a total of 30 minutes of content. Each period contains three different encodings or representations, and each representation contains segments of ten seconds duration. Therefore, there are 60 segments for each representation in a period and a total of 540 different segments. The file size of exampleMPD.xml is 52 kilobytes. For a live media presentation, the MPD on the server is updated every time a new segment is added, which for the example is every ten seconds.

In this example, it is assumed that only three different content encodings or representations are provided in a period. In other cases, a server could contain a greater number of different resolutions, multiple different bitrates, multiple languages, etc. So instead of the three different encodings of the example, a much greater number of representations could be available. Also, in the example MPD, only 30 minutes of content are described. Another MPD might describe, for example, a sporting event that is three hours or more in length.

In a second example, it might be assumed that 15 representations and 2.5 hours of content are described in the MPD. Compared to the first example of three representations and 30 minutes of content, the size of the MPD stored on the server has been multiplied by 25 (i.e., five times as many representations multiplied by five times the duration of the content). Therefore, in the second example, an MPD of about 1.3 megabytes of data (52 kilobytes times 25) would need to be stored on the server and provided and/or obtained every ten seconds. Providing and/or obtaining such a large file so frequently to perhaps hundreds of clients could consume large quantities of bandwidth.

One possible solution to this large bandwidth consumption could be to compress the MPD with a compression application. However, in the case of live streaming, the client typically downloads the MPD every ten seconds or so in order to find out the location of the latest segment encoded, and the MPD grows with each new segment that is added to the streamed content. Compression of the MPD does not adequately resolve the problem of a growing MPD. Further, the resource cost of compressing and uncompressing the MPD for every segment may be significant.

Most of the information in the MPD remains unchanged when the MPD is updated. For example, every time a new segment is added within a period, only a "Url" element is added to each representation. For instance, in the MPD of FIG. 2, there are up to 540 different "Url" elements, and every ten seconds only three are being added. The other information in the MPD typically stays the same.

Figure 3:
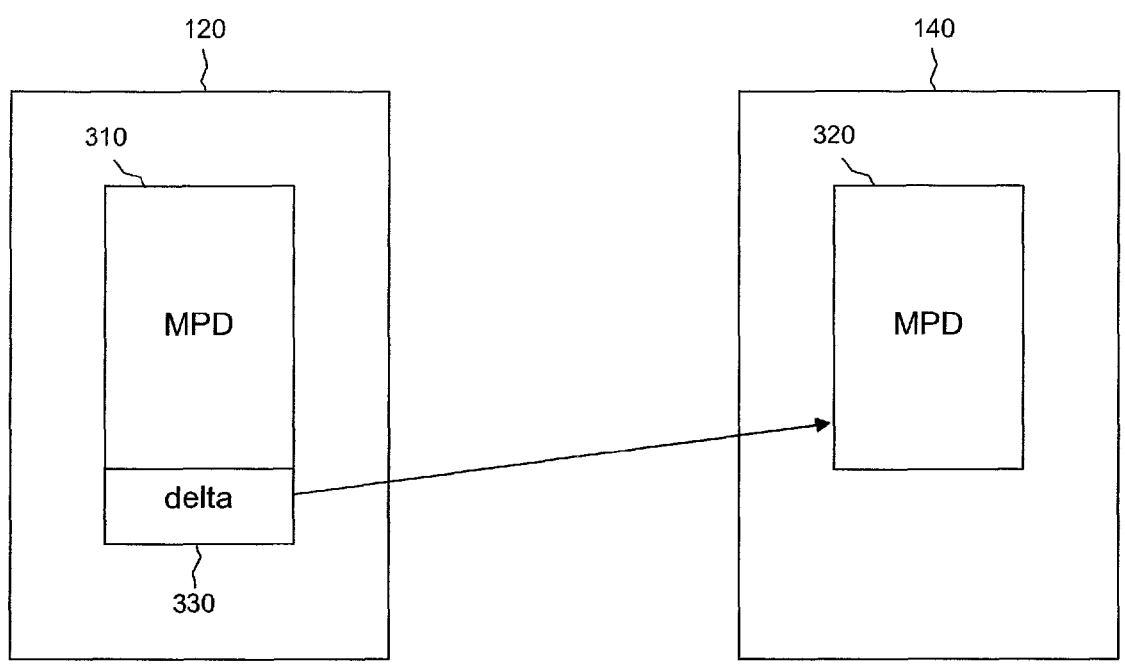
FIG. 3 is a system architecture for adaptive HTTP streaming according to an embodiment of the disclosure.

In an embodiment, the client downloads only the information that has actually changed since the last download of MPD information. This is illustrated in FIG. 3, where the server 120 includes an MPD 310 that describes a media presentation available from the server 120. The client 140 also includes an MPD 320, and the client's MPD 320 should be synchronized with the server's MPD 310 so that the client 140 has up-to-date information about the media presentation. A delta file 330 is created (perhaps by the content provider) that includes the information that has changed since the last update of the MPD. The client 140 can download the delta file 330 whenever a new segment is added to the presentation rather than downloading the entire MPD every time a new segment is added. That is, once the client 140 has downloaded the entire MPD 310, the client 140 can merely download the delta file 330 whenever the delta file 330 is updated.

In an embodiment, the server 120 is a standard web server compliant with HTTP 1.1 or higher. That is, the server 120 does not have capabilities such as XML Configuration Access Protocol (XCAP) functionality or Session Initiation Protocol (SIP) functionality.

XML Path Language (XPath) is a language defined by the World Wide Web Consortium (W3C) for defining parts of an XML document. RFC 5261 describes element schema types for "patches" or changes to an XML document that use XPath selectors. The "patches" defined in RFC 5261 are <add>, <replace>, and <remove>. These can be used to describe changes to elements or attributes. These element schema types can be used in an XML Schema which describes XML "delta files" (XML files that describe changes to an XML document). In an embodiment, it is therefore possible to describe to the client only what has changed in the latest update to the MPD. Clients that are just tuning in could still download the complete MPD. However, other clients could download only a delta file to find out what has been changed after the latest update. The MPD itself can contain a "minimum update" duration that indicates the frequency with which the MPD may possibly be updated. So if the MPD is updated every 10 seconds, the client would download the complete MPD when it first tunes in, and thereafter could just download the delta file. It is possible to create several types of delta files. In other embodiments, languages other than XPath could be used to identify a point in the MPD.

The following is an example of an XPath expression that indicates the element to which the URL element in the representation of Period 3 with 239K bandwidth is appended:

//Period [3]/*[@bandwidth='239000']/SegmentInfo]

So after the "Url" element for the last segment is added for this MPD, this could be described, using the patch operations of RFC 5261 for example, with a syntax such as:

```
<add sel="//Period[3]/Representation[@bandwidth=
'239000']SegmentInfo"><Url sourceURL="p3rep1.3gp" range=
"17642842-17943394"/></add>
```

In this example, the "delta" consists of three parts. The fact that the change to the MPD consists of something added is indicated by the <add> element. The "sel" attribute indicates where the element is to be added. In other words, the value of the "sel" attribute is an XPath expression indicating where in the MPD the element is to be added. In this case, it is added as the last child node of SegmentInfo. The element that was added is the text within the <add> element. Therefore, as an example, the changes made to the MPD could be described with the following three delta expressions:

```
AppendElement
//Period[3]/Representation[@bandwidth='239000']/SegmentInfo/
Url[last( )]
<Url sourceURL="p3rep1.3gp" range="17642842-17943394"/>
AppendElement
//Period[3]/Representation[@bandwidth='478000']/SegmentInfo/
Url[last( )]
<Url sourceURL="p3rep2.3gp" range="35284728-35885833"/>
AppendElement
//Period[3]/Representation[@bandwidth='892000']/SegmentInfo/
Url[last( )]
<Url sourceURL="p3rep3.3gp" range="65844317-66966044"/>
```

Alternatively, as another example, the changes made to the MPD could be described with the following XML language:

```
<add sel="//Period[3]/*[@bandwidth='239000']SegmentInfo">
<Url sourceURL="p3rep1.3gp" range="17642842-17943394"/></add>
<add sel="//Period[3]/*[@bandwidth='478000']SegmentInfo">
<Url sourceURL="p3rep2.3gp" range="35284728-35885833"/></add>
<add sel="//Period[3]/*[@bandwidth='892000']SegmentInfo">
<Url sourceURL="p3rep3.3gp" range="65844317-66966044"/></add>
```

In this case, the "sel" attribute contains the XPath expression and the text within the <add> element contains the element added to the MPD.

The second example above has a total size of 362 bytes. So instead of each client having to download or receive something on the order of 52 kilobytes every ten seconds as in the example of FIG. 2, now each client only has to download or receive 362 bytes. This is less than $\frac{1}{100}^{th}$ of the size and therefore is much more bandwidth efficient. This could save computational resources as well by clients not having to compress and uncompress every ten seconds.

The location of the delta files could be obtained by the client in the same way that the client determines the location of the MPD. Alternatively, the delta file location could be referenced within the MPD. There could be one delta file or a plurality of sequentially numbered delta files.

In an embodiment, the MPD can include an indicator that indicates that the MPD supports the use of delta files. That is, in order to make use of the delta files, the client may need to know that the delta files are available. The client might be made aware of this fact by an indicator in the MPD. For example, an element in the MPD might indicate that delta files are being used to describe updates to the MPD. Attributes of the element might indicate how many delta files are stored, the names of the delta files, the frequency with which the delta files are updated, and/or other information. In other embodiments, the indicator might indicate that the updates are available in some other form, as described below.

The client has various means of knowing that it has not missed a delta update. The MPD can contain a "minimum update" duration that indicates the frequency with which the MPD may possibly be updated. If there is a minimum update duration described in the MPD, then the client knows that the MPD will not be updated more frequently than that duration, and the client need not seek the delta files at a frequency greater than that duration. So if the MPD is updated every ten seconds, the client would download the complete MPD when it first tunes in, and thereafter would just download the delta file every ten seconds. If the client continues to download delta files every ten seconds, the client can be assured that it has not missed a delta file.

Alternatively, at the same time that the MPD is updated, a delta file can be made available on the server to the client. If the client updates at the frequency of the minimumUpdatePeriod, then it knows that it will not miss a delta file update. Also, previous versions of the delta file can be stored so that the client need not request the delta file at the minimum update frequency. For example, the delta file can have filename delta.xml. The previous version of delta.xml can be stored in delta-1.xml and the previous version of delta1.xml can be stored in a file named delta-2.xml. delta.xml (and thus delta-1.xml and delta-2.xml) contains sequence numbers so that the client can know if it has missed a version. So, if the client were to download delta files at twice the minimumUpdatePeriod, it can be sure that there have not been more than two different updates to the MPD, but it cannot know for sure if there have been 0, 1, or 2 updates. The sequence in the delta file provides this indication.

Alternatively, in another embodiment, the delta files could be given filenames that are numbered sequentially, and the client could confirm that it has not missed a number in the sequence. For example, in order for a client to exploit the concept of a delta file without having to tune in every ten seconds (or whatever the minimum update duration happens to be), multiple delta files could be created. For instance, if the minimum update happens to be ten seconds, then "delta_10" could be a delta file that specifies what has changed in the most recent version of the MPD relative to the immediately preceding version of the MPD, "delta_20" could be a delta file that specifies what has changed in the two most recent version of the MPD, and so on. If the client wants a delta file that has been updated every ten seconds, the client could download the delta_10 file, if the client wants a delta file that has been updated every 20 seconds, the client could download the delta_20 file, and so on. Also, if the client is aware that it has missed a delta_10 file, for example, the client could download a delta_20 file and remain in synchronization with the MPD on the server. A standard naming convention for the delta files could be used, or the names of the files could be placed in the MPD.

In another alternative embodiment, the delta files might be given different version numbers, version names, or sequence numbers that indicate which update in a plurality of updates the delta files represent. In this case, the delta files would not necessarily need to be created in a periodic manner. For example, the delta files might be given names such as "revision1" for a first revision to the original MPD, "revision2" for a revision that includes all updates since "revision1", "revision3" for a revision that includes all updates since "revision2", and so on. The revisions would not necessarily be generated at intervals that correspond to the intervals at which the content described by the MPD is updated. That is, if a new segment of content is added every ten seconds, the delta files might be created at some other periodic interval or might be created without any regular periodicity. If the client wished to update its MPD, the client could simply download all delta files with revision numbers greater than the revision number of the most recent delta file that it downloaded. The client would not need to download the delta files with any regular frequency.

In an embodiment, if the client failed to obtain a delta file for any reason, the client could download the entire MPD again. Thereafter, the client might resume downloading only the delta files.

Although the AddElement and DeleteElement commands can describe the most common deltas, such as segment descriptions added or deleted from the MPD, many other commands are possible. For example AddSibling, AddChild, AddParent, DeleteSibling DeleteChild, DeleteParent, AddAttribute, ReplaceAttribute, RemoveAttribute, etc.

As an alternative to having the delta files, a <delta> tag could be placed near the top or bottom of the MPD, so that a client could use a partial GET, or a similar message, to download only a portion of the MPD. That is, information that has changed in the MPD since the last update of the MPD could be placed between the opening and closing <delta> tags. The client could then retrieve only the information inside the delta tags and could ignore the remainder of the MPD.

HTTP Adaptive Streaming is currently client controlled and, as described above, the server is a standard web server. However, in the future, the server may include additional functionality. Therefore, in an embodiment, the client could initially download the MPD, and then updates in the form of a delta file or in some other form could be pushed to the client by the server instead of the client checking the server for updates.

In another embodiment where the server has additional functionality, instead of the client using the combination of the "delta" approach and XPath to access the MPD, XCAP could be used to provide the MPD to the client. In this case, no delta files would need to be prepared. Instead, a predictable or known identifier or sequence number could be given to each segment of metadata in the MPD. The client could directly access the MPD file on an XCAP-enabled server and use XCAP GET to point to the element in the MPD that follows the most recent element that the client downloaded. The client could then retrieve a specified number of elements starting at that point. The XCAP mechanisms to access XML documents are described in RFC 4825. Alternatively, the server could use an XCAP-based message to push MPD updates to the client.

In another alternative where the server has additional functionality, a subscription/notification model could be used to notify the client of changes to the MPD. That is, the client could subscribe to be notified of changes to the MPD, and the server could notify the client of any changes when the changes occur. The subscription/notification model can be implemented using SIP:SUBSCRIBE/SIP:NOTIFY or using XDCP (XML Document Command Protocol), which is an alternate mechanism to SIP that is based on HTTP. Both of these mechanisms are described in the OMA XDM (XML Document Management) 2.1 Enabler specifications. In order to support these mechanisms, an Application Usage for MPD is required to host the MPD file in the XDM Server. And the XDM Client needs to be implemented on the UE (User Equipment) to be able to access and subscribe to the MPD file as specified in the Application Usage.

In any of these alternatives where the server has additional functionality, an indicator could be included in the MPD to indicate that the server supports the use of updates to the MPD. That is, similar to the indicator described above that indicates the support of delta files, an indicator could indicate that the server has the capability to push MPD updates to the client, the capability to use XCAP to provide MPD updates to the client, the capability to use a subscription/notification model to inform the client of MPD updates, or other capabilities for providing MPD updates to the client. The client could then have appropriate functionality to interpret the indicator and take appropriate actions to receive updates of the MPD without receiving the entire MPD.

FIGS. 4*a* and 4*b* illustrate an example of a delta schema that might be used for the delta files discussed above.

Figure 5:
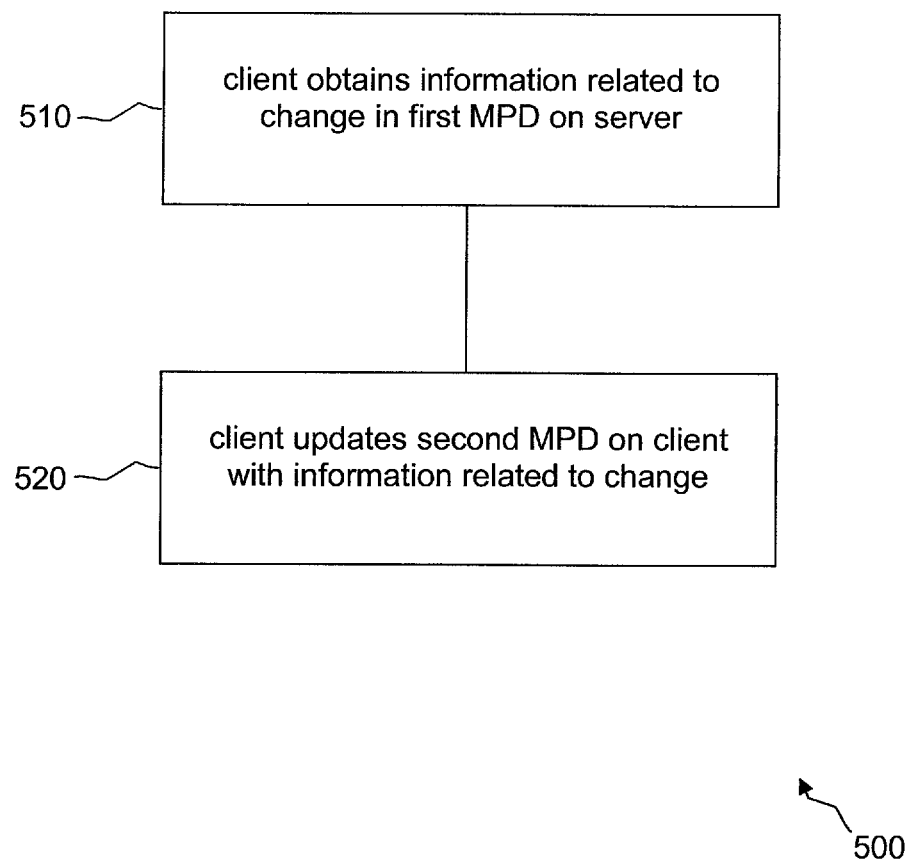
FIG. 5 is a flow chart illustrating a method for obtaining media presentation description information according to an embodiment of the disclosure.

FIG. 5 illustrates an embodiment of a method 500 for obtaining media presentation description information. At block 510, a client obtains information related to a change in a first MPD on a server. At block 520, the client updates a second MPD on the client with the information related to the change.

In summary, an element can be added to the MPD to indicate support for delta files. The name of the element added to the MPD might be "delta". The element "delta" can contain an attribute named "numberOfStoredDeltas", which takes a positive integer value. The name of the delta file might be "delta.xml" and its previous version might be "delta-1.xml". The previous version of "delta-1.xml" might be "delta-2.xml", etc. So if the value of the attribute "numberOfStoredDeltas" is "3", then the client knows that the files delta.xml, delta-1.xml, and delta-2.xml exist on the server.

Also, the schema in FIG. 4 could be used for the delta files. The value of the "sel" attribute in any <add>, <replace>, or <remove> element can be a valid XPath expression. The schema contains an attribute "xpathVersion" indicating the version of XPath to be used. The default value is "1.0". If another version of XPath is used, it could be indicated via the value of the "xpathVersion" attribute. If the client, upon downloading a delta file, finds an error in the XPath expression in a "sel" attribute, it can download the entire MPD.

The client, server, and other components described above might include a processing component that is capable of executing instructions related to the actions described above.

Figure 6:
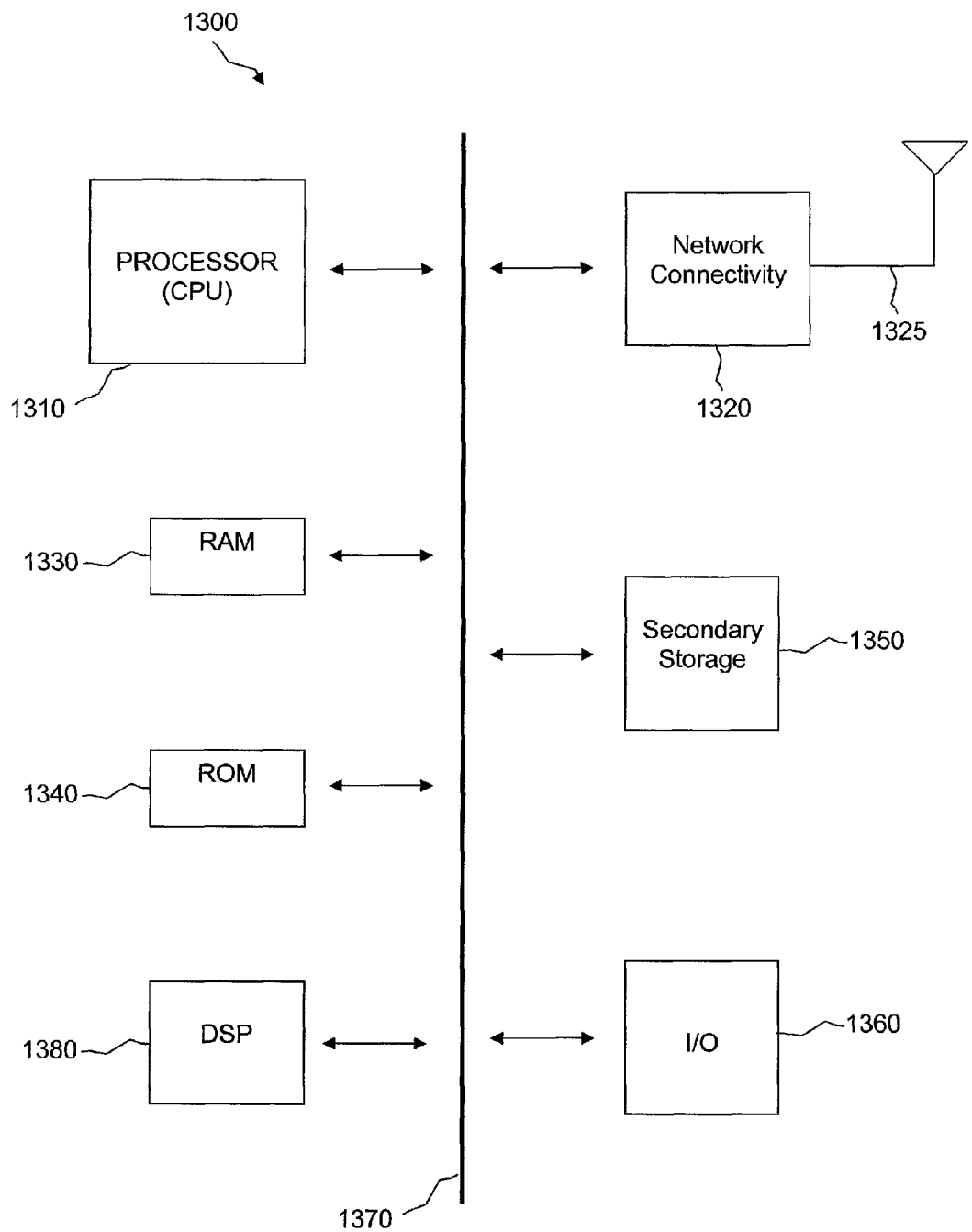
FIG. 6 illustrates a processor and related components suitable for implementing the several embodiments of the present disclosure.

FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method for obtaining media presentation description information is provided. The method includes a client obtaining information related to a change in a first MPD on a server. The method further includes the client updating a second MPD on the client with the information related to the change.

In another embodiment, a client is provided. The client includes a processor configured such that the client obtains information related to a change in a first MPD on a server, and configured such that the client updates a second MPD on the client with the information related to the change.

The following are incorporated herein by reference for all purposes: 3GPP Technical Specification (TS) 26.234, 3GPP TS 26.244, ISO/IEC 14496-12, Internet Engineering Task Force (IETF) Request for Comments (RFC) 5874, and IETF RFC 5261.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
   receiving, at a client, a media presentation description (MPD) that includes an Extensible Markup Language (XML) element that indicates support, by a server, of MPD data files, wherein the XML element comprises a first XML attribute comprising a Uniform Resource Locator (URL) of an MPD delta file that includes a change to the MPD; and
   sending, by the client, a hypertext transfer protocol (HTTP) GET request for the MPD delta file, wherein the HTTP GET request comprises the URL.

2. The method of claim 1, wherein the MPD delta file further comprises a change command and a location at which the change command is applied.

3. The method of claim 2, wherein the change command comprises one of:
   an add command;
   a delete command; or
   a replace command.

4. The method of claim 1, wherein the XML element comprises a second XML attribute indicative of a duration of time associated with the MPD delta file.

5. The method of claim 1 further comprising sending, by the client, a second HTTP GET request for a second MPD based on a failure of the HTTP GET request for the MPD delta file.

6. The method of claim 1, wherein the XML element comprises a second XML attribute indicative of an availability of the MPD delta file.

7. The method of claim 1, wherein the client subscribes to receive the MPD delta file and the client is notified when the MPD delta file becomes available.

8. A client, comprising:
   a processor configured to:
   receive, at the client, a media presentation description (MPD) that includes an Extensible Markup Language (XML) element indicating support, by a server, of MPD delta files, wherein the XML element comprises a first XML attribute comprising a Uniform Resource Locator (URL) of an MPD delta file that includes a change to the MPD; and
   send, by the client, a hypertext transfer protocol (HTTP) GET request for the MPD delta file, wherein the HTTP GET request comprises the URL.

9. The client of claim 8, wherein the processor is further configured to receive a change command and a location at which the change command is applied, the change command and the location being included within the MPD delta file.

10. The client of claim 9, wherein the change command comprises one of:
    an add command;
    a delete command; or
    a replace command.

11. The client of claim 8, wherein the processor is further configured to receive a second XML attribute indicative of a duration of time associated with the MPD delta file.

12. The client of claim 8, wherein the processor is further configured to send a second HTTP GET request for a second MPD based on a failure of the HTTP GET request for the MPD delta files.

13. The client of claim 8, wherein the processor is further configured to receive a second XML attribute indicative of an availability of the MPD delta file.

14. The client of claim 8, wherein the client subscribes to receive the MPD delta file and is notified when the MPD delta file becomes available.

15. A method, comprising:
    transmitting, from a network device, a media presentation description (MPD) that includes an Extensible Markup Language (XML) element that indicates support, by a server, of MPD delta files, wherein the XML element comprises a first XML attribute comprising a Uniform Resource Locator (URL) of an MPD delta file that includes a change to the MPD; and
    receiving, by the network device, a hypertext transfer protocol (HTTP) GET request for the MPD delta file, wherein the HTTP GET request comprises the URL.

16. The method of claim 15, wherein the server is compliant with HTTP standard 1.1.

17. The method of claim 15, wherein the MPD delta file further comprises a change command and a location at which the change command is applied.

18. The method of claim 17, wherein the change command comprises one of:
    an add command;
    a delete command; or
    a replace command.

19. The method of claim 15, wherein the XML element comprises a second XML attribute indicative of a duration of time associated with the MPD delta file.

20. The method of claim 15, wherein the XML element comprises a second XML attribute indicative of an availability of the MPD delta file.

21. The method of claim 15 further comprising receiving a second HTTP GET request for a second MPD.

22. The method of claim 15 wherein the network device comprises the server.

23. A network device, comprising:
a processor configured to:
transmit a media presentation description (MPD) that includes an Extensible Markup Language (XML) element that indicates support, by a server, of MPD delta files, wherein the XML element comprises an XML attribute comprising a Uniform Resource Locator (URL) of an MPD delta file that includes a change to the MPD; and
receive a hypertext transfer protocol (HTTP) GET request for an MPD delta file.

24. The network device of claim 23 wherein the server is compliant with HTTP standard 1.1.

25. The network device of claim 23, wherein the processor is further configured to include a change command and a location at which the change command is applied within the MPD delta file.

26. The network device of claim 25, wherein the change command comprises one of:
an add command;
a delete command; or
a replace command.

27. The network device of claim 23, wherein the processor is further configured to include a second XML attribute indicative of a duration of time associated with the MPD delta file within the element.

28. The network device of claim 23, wherein the processor is further configured to include a second XML attribute indicative of an availability of the MPD delta file within the element.

29. The network device of claim 23, wherein the processor is further configured to receive a second HTTP GET request for a second MPD.

30. The network device of claim 23, wherein the network device comprises the server.

* * * * *